United States Patent [19]
Lim et al.

[11] Patent Number: 5,796,810
[45] Date of Patent: Aug. 18, 1998

[54] APPARATUS FOR DIALING OF CALLER ID BLOCK CODE AND RECEIVING CALL WAITING CALLER-ID-SIGNAL

[76] Inventors: Boon Chen Lim, Flat B 26/F. Begonia Mansion; Yeung How Lim, Flat C 26/F. Begonia Mansion, both of Taikooshing, Hong Kong

[21] Appl. No.: 540,532

[22] Filed: Oct. 10, 1995

[51] Int. Cl.$^6$ .......................... H04M 1/56; H04M 15/06; H04M 1/66
[52] U.S. Cl. .................. 379/142; 379/93.05; 379/199; 379/372
[58] Field of Search ..................... 379/142, 215, 379/201, 372–376, 93.05, 53.01, 188, 194, 199

[56] References Cited

U.S. PATENT DOCUMENTS

| | | |
|---|---|---|
| 5,309,508 | 5/1994 | Rosen . |
| 5,550,908 | 8/1996 | Cai et al. ............................ 379/215 |
| 5,583,924 | 12/1996 | Lewis ................................... 379/215 |
| 5,588,049 | 12/1996 | Detering et al. . |
| 5,590,183 | 12/1996 | Yoneda et al. ....................... 379/215 |
| 5,619,561 | 4/1997 | Reese ................................... 379/215 |

FOREIGN PATENT DOCUMENTS

| | | |
|---|---|---|
| 0 437 256 | 7/1991 | European Pat. Off. . |
| 0 439 927 | 8/1991 | European Pat. Off. . |
| 3 815 908 | 6/1994 | Germany . |
| 2 251 157 | 6/1992 | United Kingdom . |
| 2 258 119 | 1/1993 | United Kingdom . |

OTHER PUBLICATIONS

Schwartz, Barry K., "The Analog Display Services Interface," *IEEE Communications Magazine*, vol. 31, No. 4, Apr. 1, 1993, pp. 70–75.

*Primary Examiner*—Paul Loomis
*Attorney, Agent, or Firm*—Townsend and Townsend and Crew LLP

[57] ABSTRACT

An apparatus for providing a convenient and flexible way for a user to dial a block code which allows the user to withhold his/her identity and telephone number when the user makes a phone call. By programming different operation modes using the keys when the apparatus is in an on-hook status, the user may elect to have a block code dialed by manually pressing a block key when desired, or to have a prompt message displayed on the screen to remind him/her to press a key to dial the block code, if so desired, when the phone is off-hook, or to have the block code auto-dialed every time the phone is off-hook. When the apparatus is in an automatic block code dialing mode, the user may override this setting and have his/her caller ID sent on a per call basis. Another aspect of the invention is a circuit arrangement which is capable of reducing the speech/voice interference to the call waiting caller-ID-alert signal during normal telephone conversation, thus improving the chance of a successful caller ID data transmission during call waiting.

11 Claims, 3 Drawing Sheets

APPARATUS FOR DIALING OF CALLER ID BLOCK CODE AND RECEIVING CALL WAITING CALLER-ID-SIGNAL

BACKGROUND OF THE INVENTION

The present invention relates to the dialing and prompting of a caller ID block code and the receiving of a call-waiting caller ID signal.

Caller ID services have been provided by telephone companies in recent years. However, some callers are reluctant to send their telephone number and identity to the called parties. The telephone companies have provided a block number service for those telephone users who wish to remain anonymous. Before initiating a call, the caller pre-dials a block code number *67 to the phone company before dialing the called party's telephone number. Then the telephone company will block the caller's number and identifications, thereby preventing this information from being sent to the called party.

For convenience dialing of a block code, an apparatus and method disclosed in U.S. Pat. No. 5,309,508 (Howard Rosen) has been developed. The apparatus is capable of dialing the block automatically when the telephone line is employed for dialing a telephone number.

Recently, the telephone companies have also provided a caller ID service for call waiting. For subscribers to this service, if there is a second incoming call while a phone conversation is already in progress, the second caller's telephone number and/or name will be sent to the subscriber. With the appropriate type of caller ID equipment attached to the subscriber's telephone line, the second caller's identifying information is received and displayed to the called party. This allows the called party to know who is calling, enabling a decision as to whether the called party wants to switch to the second call or not. The successful transmission of call-waiting caller ID information requires a successful handshaking operation during the transmission. The handshaking involves an exchange of signals between the central telephone switch and the called party's telephone. There is a certain probability that these signals may be masked by the speech in the telephone conversation, and then the caller ID data transmission would fail.

SUMMARY OF THE INVENTION

The present invention gives a telephone user greater flexibility and convenience over the prior art in dialing block codes for caller ID blocking. The present invention also helps ensure that caller ID information is accurately received by those phone systems enabled to receive caller ID information on a call-waiting line.

The first aspect of the present invention is directed to an apparatus and method for generating the block code to block caller ID information from being received by a called party. In particular, the preferred embodiment of the invention includes an apparatus that is programmable to operate in one of several operating modes. In a first operating mode, pressing a BLOCK key while the phone is on-hook causes the device to display the block code to the user. The user therefore does not have to memorize the block code from among the proliferating number of special codes which are being used by local telephone service providers. Pressing the BLOCK key while the phone is off-hook and before initiating a call causes the device to auto-dial the block code. The preferred embodiment of the present invention is also programmable to operate in a second, "block code dialing prompt," mode. In this mode, when the user picks up the phone to initiate a call, a prompt message is shown on a display which asks the user whether or not to send a block code. The preferred embodiment of the present invention is also programmable to operate in a third, "off-hook automatic block dialing" mode. In this mode, the blocking code is automatically dialed whenever the user picks up the phone to initiate a call.

A second aspect of the invention provides a circuit that effects reliable receipt of a caller ID signal when the phone is off-hook and a telephone conversation is in progress. The preferred embodiment of this aspect of the invention is a special Wheatstone bridge that reduces the interference between voice signals and caller ID signalling information thereby enhancing the reliability of receiving the call-waiting caller ID signal.

BRIEF DESCRIPTION OF THE DRAWINGS

The invention can be described in better detail with reference to the drawings.

DETAILED DESCRIPTION OF THE PREFERRED EMBODIMENT

Figure 1:
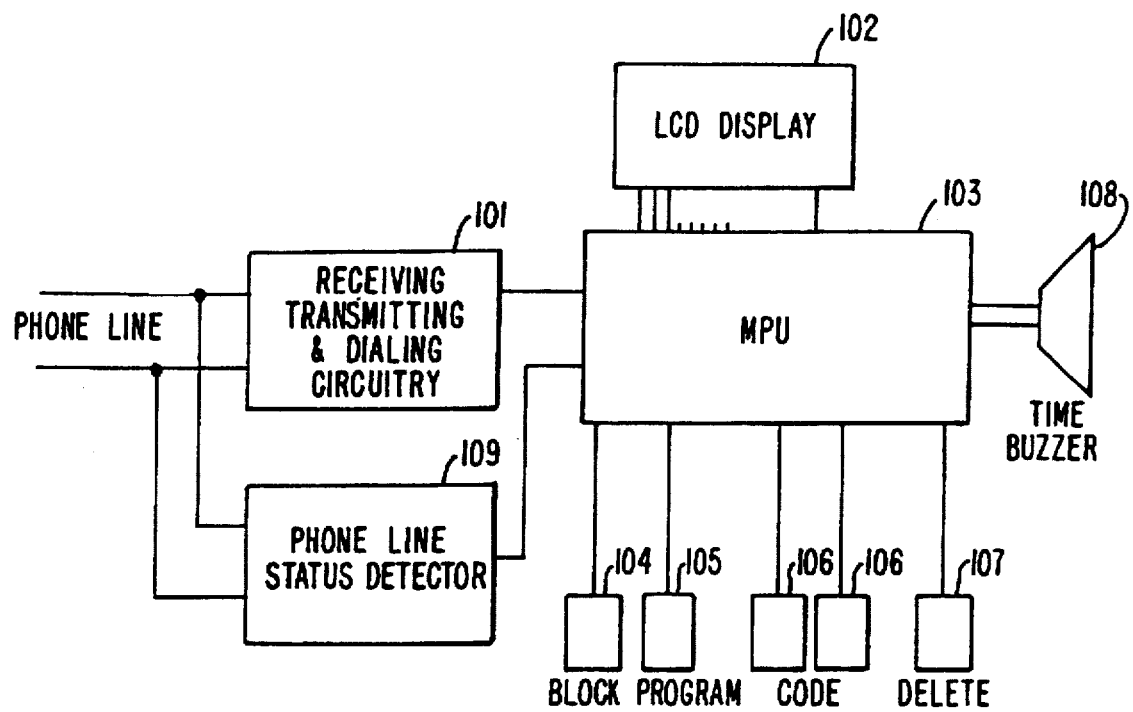
FIG. 1 is a block diagram of the apparatus embodying the invention.

The general organization of one embodiment of the invention is illustrated in the block diagram of FIG. 1. The apparatus includes a RECEIVING, TRANSMITTING and DIALING circuitry 101, LCD DISPLAY 102, MPU 103, BLOCK key 104, PROGRAM key 105, CODE keys 106, DELETE key 107, TONE BUZZER 108 and PHONE LINE STATUS DETECTOR 109.

BLOCK key 104 is preprogrammed to generate a block code description on the LCD display and to dial the block code. When the phone line is in an ON-HOOK status, it is detected by the phone line status detector 109, pressing BLOCK key 104 causes the apparatus to display a blocking prompt, e.g., "BLOCK", and the block code, e.g., "*67". That is, LCD screen 102 displays "BLOCK *67" in this embodiment.

If the phone line is in an OFF-HOOK status, pressing BLOCK key 104 causes the device to dial the block code. A confirmation message, e.g., "BLOCK DIALED", is also shown on LCD display 102 for the user's benefit.

The device is programmable to operate in a "block code dialing prompt" mode. In the preferred embodiment, this mode is entered by pressing BLOCK key 104 and an extra code key 106, e.g., an "*" key, while the device is in a PROGRAM mode. The PROGRAM mode is entered by pressing PROGRAM key 105. Thereafter, when the phone line status changes to OFF-HOOK, as detected by the phone line status detector 109, a block code dialing prompt, e.g., "TO BLOCK PRESS BLOCK," is shown on LCD display 102 to remind the user that the blocking feature is available. To enhance the effectiveness of the reminder, the block code dialing prompt message flashes and tone buzzer 108 generates an alert sound. The user may then press BLOCK key 104 to block the phone number if so desired.

The device is further programmable to operate in an "off-hook automatic block dialing" mode. In the preferred embodiment, this mode is entered by pressing the BLOCK key 104 and an extra key 106, e.g., a "#" key, while the device is in a PROGRAM mode. Thereafter, whenever the phone line status changes to OFF-HOOK, as detected by the phone line status detector 109, the block code *67 is automatically dialed.

In the preferred embodiment, the automatic block dialing feature may be overridden by the user on a per call basis as follows. When the device is in an automatic block dialing mode, pressing BLOCK key 104 while the phone line is ON-HOOK causes the device to display an override description message, e.g., "TO CANCEL PRESS DELETE," on LCD display 102. When DELETE key 107 is pressed in response to the override description message, the block code will not be automatically dialed when the user picks up the phone and the phone line goes OFF-HOOK. When the current phone call is completed, the automatic block dialing mode resumes.

The apparatus described above may be embodied as a stand-alone caller ID adjunct unit or integrated with a caller ID telephone, and the CODE key 106 shared with other functional keys of the apparatus. For example, the (original) function of CODE keys 106 may be implemented using the UP and DOWN REVIEW keys of a stand-alone caller ID unit. After PROGRAM key 105 is pressed, UP and DOWN are changed to CODE "*" and code "#" keys, respectively. When the present invention is integrated with a telephone, CODE keys 106, as well as PROGRAM key 105, may be shared with any key of a telephone.

The above description is now further described with reference to the flow chart in FIG. 2.

Figure 2:
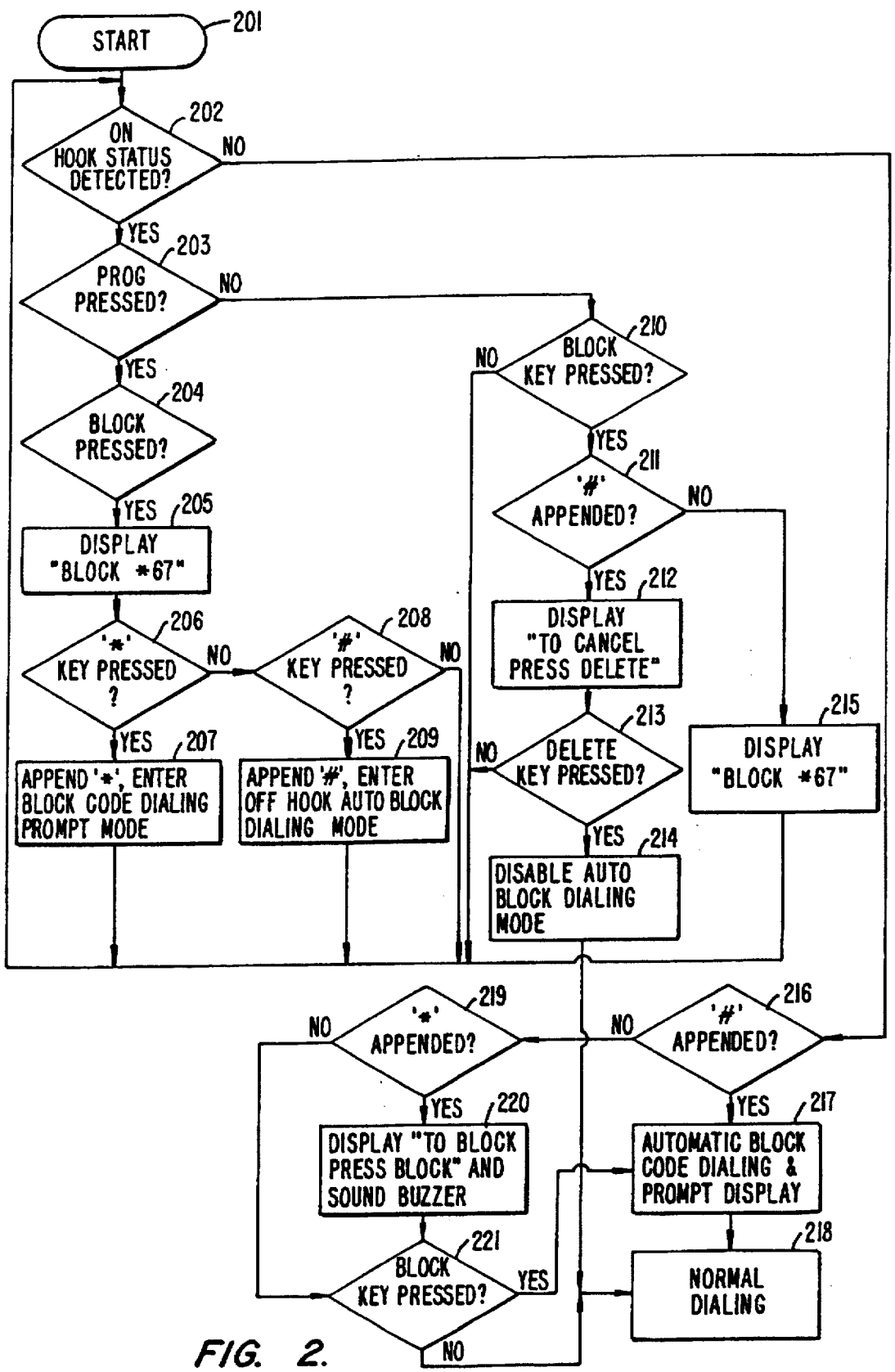
FIG. 2 is a detailed flow chart illustrating routines to perform the block code dialing/prompting.

FIG. 2 is a flow chart that shows a preferred embodiment of the present invention which allows the user to dial the caller ID block code in more convenient and flexible ways. As illustrated, the apparatus is initialized at step 201 after power up. In step 202, phone line status detector 109, determines if the apparatus or the phone line status is currently ON-HOOK. If the status is currently ON-HOOK, MPU 103 waits in step 203 to determine if the user presses PROGRAM key 105. If PROGRAM key 105 is pressed, step 204 determines if BLOCK key 104 is pressed. If BLOCK key 104 is pressed, the message "BLOCK *67 is shown on LCD Display 102 at step 205.

MPU 103 next determines if one of the special code keys 106 is pressed at steps 206 and 208. If the user presses the "*" key, an "*" is appended to the block code description to be shown on LCD Display 102 (e.g., "BLOCK* *67") and the apparatus enters the block code dialing prompt mode at step 207. Alternatively, if the '#' key is pressed, a "#" is appended to the block code description to be shown on LCD display 102 (e.g., "BLOCK# *67") and the apparatus enters the automatic block dialing mode at step 209. After completing the foregoing operations, MPU 103 returns to step 201.

If, at step 210, PROGRAM key 105 was not pressed, MPU 103 determines if BLOCK key 104 is pressed. If BLOCK key 104 is pressed, MPU 103 determines whether a "#" has been appended to the block code description at step 211, thus indicating that the apparatus is in the automatic block dialing mode. If not, then the standard block code description, e.g., "BLOCK *67," is shown on LCD Display 102. If, on the other hand, MPU 103 determines that a "#" has been appended to the block code description at step 211, then the override description message, e.g., "TO CANCEL PRESS DELETE," is shown on LCD display 102 at step 212. If DELETE key 107 is pressed, as determined at step 213, then the automatic block dialing mode is disabled at step 214. The automatic block dialing mode resumes after the current call is completed.

If, at step 202, phone line status detector 109 determines that the phone line status is OFF-HOOK, then MPU 103 next determines if the apparatus is in the automatic block dialing mode or the block code dialing prompt mode at steps 216 and 219, respectively. At step 216, MPU 103 determines if the apparatus is in the automatic block dialing mode by determining if a "#" has been appended to the block code description. If so, then MPU 103 automatically dials the block code and displays a blocking confirmation message, e.g., "BLOCK DIALED," on LCD Display 102 at step 217.

If, a "#" has not been appended to the block code description, then MPU 103 determines, at step 219, if an "*" has been appended to the block code description, thus indicating that the apparatus is in the block code dialing prompt mode. If an "*" is appended to the block code description, then MPU 103 causes the block code dialing prompt, e.g., "TO BLOCK PRESS BLOCK," to flash on LCD Display 102 and generates an alert sound on tone buzzer 108 at step 220. At step 221, MPU 103 next determines if the user has pressed BLOCK key 104. If BLOCK key 104 was pressed, MPU 103 proceeds to step 217 described above. If MPU determines at step 221 that BLOCK key 104 was not pressed, then MPU 103 proceeds to step 218 to allow normal dialing without caller ID blocking. If, at step 219, MPU determines that neither the automatic block dialing mode or the block code dialing prompt mode are enabled, then MPU 103 jumps to step 221 described above. After the phone call is terminated, MPU 103 returns to start step 201.

The concept embodied in the preferred embodiment of the present invention of adding an extra code to change or add an extra feature/function to a block code, dialing key may be further extended within the scope of the invention. The basic function of the BLOCK key is used to pre-store a block code and the description of the block code. The extra code is added for automatic prompting or dialing of the block code when the ON/OFF-HOOK status of a telephone or telephone line is changed. In fact, the key is not limited to preprogramming of the block code and the description of the blocking. Any other predetermined function may be preprogrammed to any key, and when programmed with an added extra code, the key can be used to perform not only automatic prompting or dialing of blocking in link with the ON/OFF-HOOK status of the telephone or telephone line, but may also be extended to perform any other predetermined automatic control function in link with predetermined changes of any status.

Figure 3:
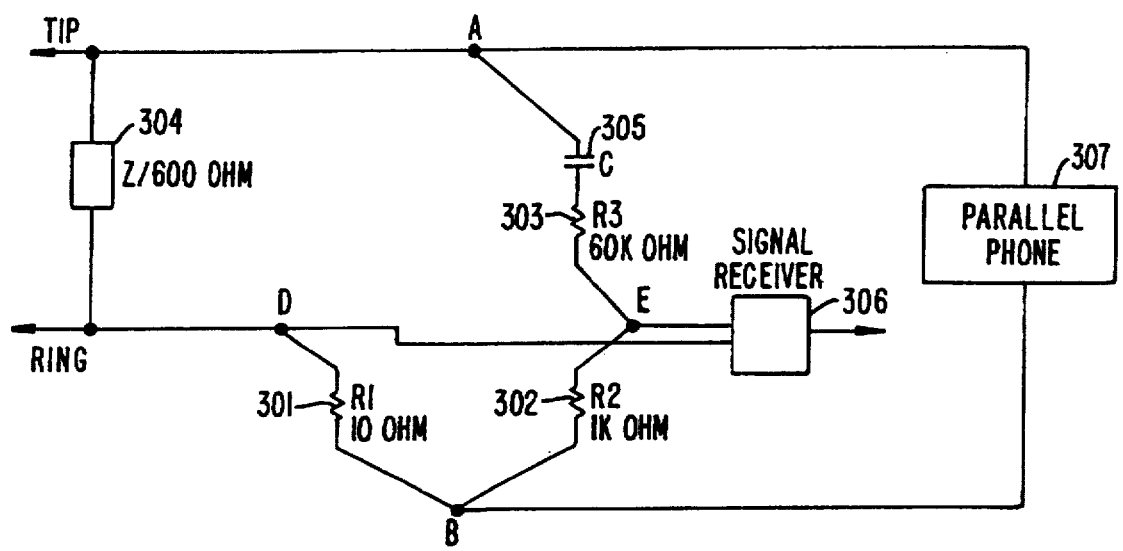
FIG. 3 is a block schematic diagram showing a circuit arrangement that reduces a voice/speech interference with the caller ID signal.

FIG. 3 is a circuit diagram of an embodiment reduces speech/voice interference to a call-waiting caller ID signal when a telephone conversation is in progress with parallel phone 307. Resistors 301, 302, 303 and line impedance 304 are connected, comprising a special Wheatstone bridge. 305 is a DC isolation capacitor. Parallel phone 307 is connected to points A and B of the bridge. Signal receiver 306 is used for receiving the call-waiting caller ID signal. The input of this signal receiver is connected to points D and E. The impedance Z of the phone line is a typical 600 Ohm. The value of the resistors 301(R1), 302(R2) and 303(R3) is suitably adjusted to balance the bridge, is well known in the art. When balanced, the level of speech which comes from points A and B that appear between points D and E, i.e., the input of the signal receiver 306, is ideally reduced to zero. Thus the interference by speech coming from parallel phone 307 is reduced. However, speech sent to the phone line TIP and Ring from parallel phone 307 is only negligibly reduced by resistor 301 (in serial) whose low value (e.g., 10 Ohm) is intentionally selected to minimize attenuation. The signal coming from the phone line to parallel phone 307 and to signal receiver 306 is also only negligibly reduced.

The foregoing is offered primarily for the purposes of illustration. It will be readily apparent to one of ordinary skill in the art that the components of the described apparatus for dialing block codes, the steps of the described block code dialing method, the described circuit for reducing interference between a voice/speech signal and an incoming caller ID signal, and other parameters of the invention may be further modified or substituted in various ways without departing from the spirit and scope of the invention, defined by the appended claims.

What is claimed is:

1. An apparatus, coupled to a telephone line, for dialing a block code to a central telephone switching office for blocking the transmission of information identifying a caller to a called party, comprising:
   a block key where a block code and a first set of block code prompts and descriptions are preprogrammed;
   a program means for causing said apparatus to enter an additional code programming mode;
   an additional code means for programming said block key to enter one of a plurality of additional operation modes;
   an ON/OFF-HOOK status detector for detecting the ON/OFF-HOOK status of said apparatus or of said telephone line;
   a display for displaying said various block code prompts and descriptions;
   wherein, when no additional operation mode is programmed in said block key, pressing said block key while said telephone line is ON-HOOK causes said apparatus to display said block code and a block code description on said display;
   wherein, when no additional operation mode is programmed in said block key, pressing said block key while said telephone line is OFF-HOOK causes said apparatus to dial said block code and to display a first block code confirmation description on said display;
   wherein, when any one of said plurality of additional operation modes is programmed in said block key, pressing said block key while said telephone line is ON-HOOK causes said apparatus to display a second set of block code prompts and descriptions on said display;
   wherein, when a first of said plurality of additional operation modes is programmed in said block key and said ON/OFF-HOOK status detector indicates said telephone line is OFF-HOOK, said apparatus displays a prompt message on said display asking a user whether he/she want to dial said block code;
   wherein, when a second of said plurality of additional operation modes is programmed in said block key and said OFF-HOOK status detector indicates said telephone line is OFF-HOOK, said apparatus automatically dials said block code and displays a second block code confirmation description on said display.

2. The apparatus of claim 1, further comprising a delete/cancel means, and wherein, when said second of said plurality of operation modes is programmed, activating said delete/cancel means causes said automatic dialing of said block code to be cancelled for a current call or for all subsequent calls.

3. The apparatus of claim 1, wherein said apparatus is integrated with a stand-alone caller-ID unit or a caller-ID integrated telephone, and said program means and said additional code means are shared with any key of said telephone.

4. The apparatus of claim 2, wherein said apparatus is integrated with a stand-alone caller-ID unit or a caller-ID integrated telephone, and said program means and said additional code means are shared with any key of said telephone.

5. The apparatus of claim 1, wherein said apparatus is integrated with a call-waiting caller-ID signal receiving means including a Wheatstone bridge whose circuit connections decrease interference of speech/voice signals from a telephone connected in parallel with the said apparatus.

6. The apparatus of claim 2, wherein said apparatus is integrated with a call-waiting caller-ID signal receiving means including a Wheatstone bridge whose circuit connections decrease interference of speech/voice signals from a telephone connected in parallel with the said apparatus.

7. An apparatus, coupled to a telephone line, for dialing a block code to notify a central telephone switching office to block transmission of information identifying a caller to a called party, said apparatus comprising:
   a dialing circuit coupled to said phone line;
   a line status detecting circuit, coupled to said phone line, for detecting an OFF-HOOK status and an ON-HOOK status of said telephone line;
   a plurality of keys for controlling said block code dialing and for selecting among a plurality of operating modes;
   a display unit for displaying a plurality of messages to a user;
   a central processing unit, coupled dialing circuit, to said line status detecting circuit, to said plurality of keys, and to said display unit, said CPU including:
      means, responsive to a said plurality of keys, for designating one of said plurality of operating modes;
      means, responsive to a first one of said plurality of keys being activated while said telephone line is ON-HOOK, for generating a block code description message on said display unit when said apparatus is in a first operating mode;
      means, responsive to said first one of said plurality of keys being activate while said telephone line is OFF-HOOK, for dialing a block code with said dialing circuit and for generating a first block code confirmation message on said display unit when said apparatus is in a first operating mode;
      means, responsive to said telephone line being in an OFF-HOOK status, for generating a block code prompting message on said display when said apparatus is in a second operating mode; and
      means, responsive to said telephone line being in an OFF-HOOK status, for automatically dialing said block code with said dialing circuit and for generating a second confirmation message on said display when said apparatus is in a third operating mode.

8. A call-waiting, caller-ID receiving apparatus, comprising:
   a receiver for receiving a caller-ID signal that originates from a telephone line; and
   a Wheatstone bridge, coupled to said receiver, to said telephone line, and to a speech generating source; and
   wherein said connections of said Wheatstone bridge reduces/eliminates the interference of speech/voice coming from the said speech generating source to said caller-ID signal originating from the telephone line to the said receiver.

9. A call-waiting, caller-ID receiving apparatus as claimed in claim 8, wherein the said speech generating source is a telephone, and the connection of the telephone to said Wheatstone bridge is via telephone sockets.

10. A call-waiting, caller-ID receiving apparatus, comprising:

a receiver for receiving a caller-ID signal originating from a telephone line; and a low value resistor, coupled in serial with the TIP or RING of the telephone line, for feeding said caller-ID signal to said receiver, and means for reducing/eliminating speech interference; and a telephony speech transmitting/receiving means coupled to said telephone line via said speech interference reducing/eliminating circuit means, for transmitting speech to said telephone line and receiving speech from the telephone line; and wherein a voltage level across the said low value resistor responsive to the speech from the said speech transmitting/receiving means, together with a voltage level of the said other speech interference reducing/eliminating circuit means, will interact to reduce/eliminate the interference of the speech transmitted by said speech transmitting/receiving means to said caller-ID signal originating from the telephone line and received by the said receiver.

11. A call-waiting, caller-ID receiving apparatus as claimed in claim 10, wherein the said low value resistor, said speech interference reducing/eliminating means, and the impedance of the telephone line forms a Wheatstone bridge, wherein a value of the parameters of the said Wheatstone bridge are selected to make the level of the interference of the said speech to the caller-ID signal received by the said receiver to be reduced/minimal.

* * * * *